Nov. 14, 1967   C. L. FARRAND   3,353,095
VARIABLE SPEED POSITION MEASURING TRANSFORMER SYSTEM
Filed June 25, 1964   2 Sheets-Sheet 2

| SPEED | 27 | 9 | 3 | 1 |
| NO. POLES | 54 | 18 | 6 | 2 |
|  | + | – | –0– | + |

INVENTOR.
CLAIR L. FARRAND
BY W. E. Beatty
ATTORNEY

United States Patent Office 3,353,095
Patented Nov. 14, 1967

3,353,095
VARIABLE SPEED POSITION MEASURING TRANSFORMER SYSTEM
Clair L. Farrand, Bronxville, N.Y., assignor to Inductosyn Corporation, Carson City, Nev., a corporation of Nevada
Filed June 25, 1964, Ser. No. 377,873
6 Claims. (Cl. 323—53)

ABSTRACT OF THE DISCLOSURE

The invention employs position measuring transformers in the form of resolvers having polyphase input and output windings having a common drive. The resolvers may be connected in different combinations to provide a number of different transformer speeds, wherein "speed" represents the number of coupling waves per revolution. For example, a resolver having 54 poles produces 27 coupling waves per revolution. This has been designated a 27-speed device.

---

The invention relates to a variable speed position measuring transformer system and has for an object to provide a transformer system which will operate at any one of a number of speeds.

A further object of the invention is to provide a transformer system employing a plurality of individual position measuring transformers with switching means for connecting the individual transformers to provide any one of a number of resultant transformer speeds each of which is the algebraic sum of the speeds of the individual transformers.

Rotary position measuring transformers such as resolvers, selsyns and Inductosyns (trademark) and others have been used with relatively movable members having windings with two or more poles. With two poles, one cycle of the coupling wave is produced between the windings of the transformer for each revolution. This has been designated a one-speed field. When a plurality of poles are used such as, for example, fifty-four poles, producing twenty-seven cycles of the coupling wave per revolution, this has been designated a twenty-seven-speed device. Hence, speed as applied to a position measuring transformer represents the number of cycles of coupling wave per revolution.

According to the invention, the position measuring transformers are in the form of resolvers having polyphase input and output windings having a common drive and may be connected in different combinations to provide a number of different transformer speeds.

A comparatively small number of position measuring transformers are arranged to provide a larger number of different speeds. A feature of the invention is the provision of a small number such as four position measuring transformers having speeds which vary according to successive powers of three (tertiary system), switches being provided for connecting these transformers in different combinations for producing a large number of speeds such as forty different speeds from 1 to 40.

The position measuring transformers employed in the system of the present invention may be resolvers with two phase input and output windings as indicated at 23 FIG. 1 of Patent 2,950,427 dated Aug. 23, 1960. These resolvers may have more than two phases and may embody the improvements described and claimed in Patent 2,799,-835, dated July 16, 1957.

As the position measuring transformer system of the present invention provides, or is equivalent to a position measuring transformer of a selected number of poles, or speed, this system may be employed for any of the purposes of a position measuring transformer, as described in the above 2,799,835 patent. Also, the system of the present invention, wherein the transformers have rotors on one shaft, may be associated with a similar system having rotors on another shaft, the two transformer systems being connected in tandem and zeroed and their resultant error signal employed to servo the shafts to an accurate ratio of shaft speed as described and claimed in copending application S.N. 377,874, filed June 25, 1964, by applicant for Position Measuring Transformer System for Multiple Shaft Synchronization.

For further details of the invention reference may be made to the drawings wherein.

Figure 1:
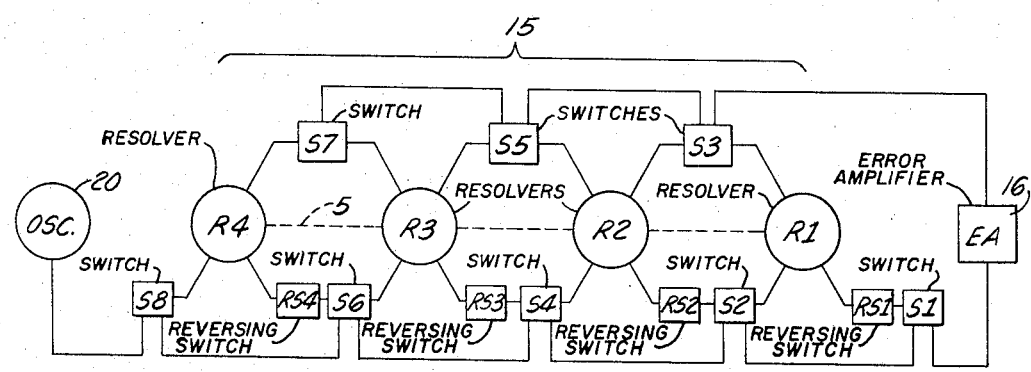
FIG. 1 is a schematic showing of a position measuring transformer system with switches for connecting the transformers in different combinations to provide a number of different speed ratios for one shaft, according to the invention.
Figure 2:
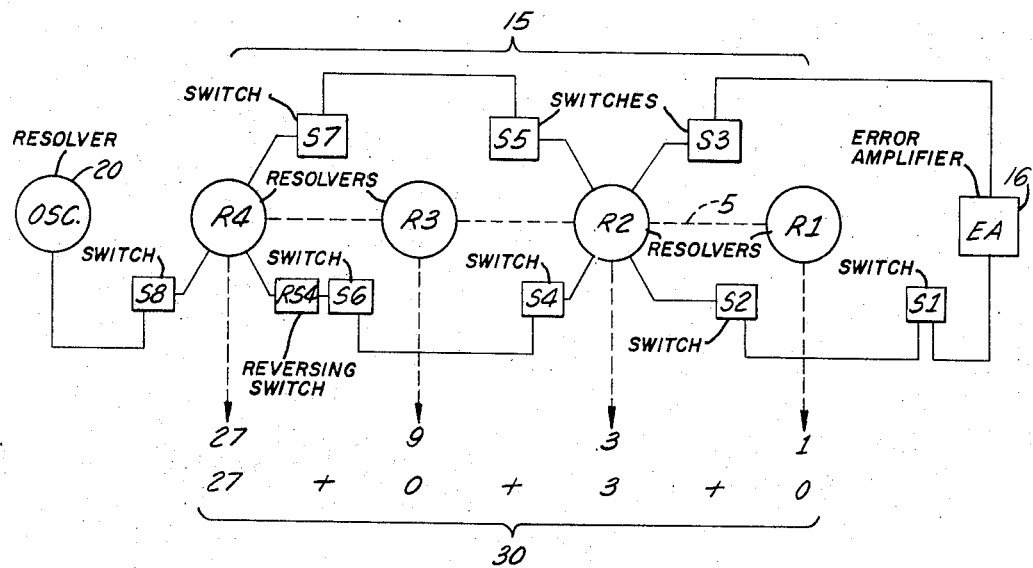
FIG. 2 is a schematic showing of the system of FIG. 1, illustrating a typical example wherein the switches are operated to provide a particular value of the speed of the transformer combination.
Figure 3:
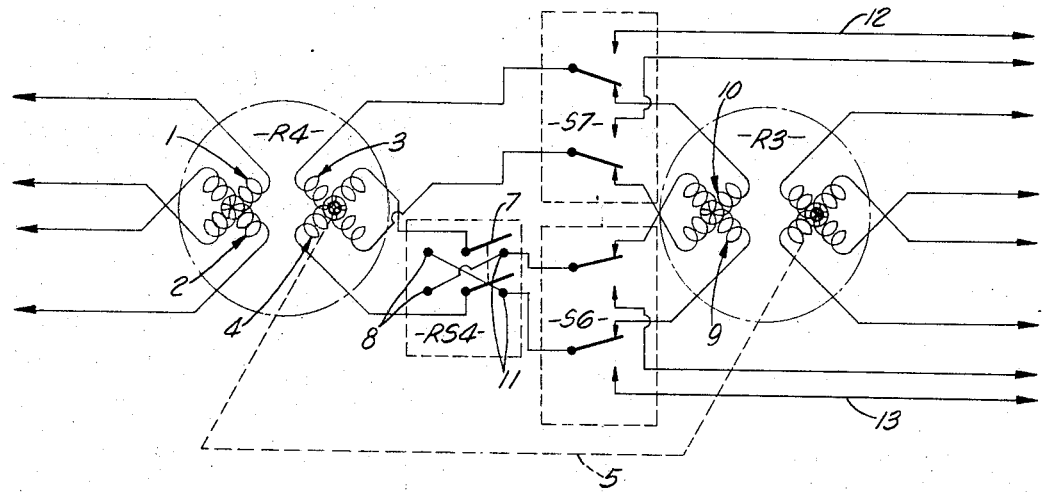

FIG. 3 is a detailed showing of three switches employed between adjoining transformers in FIGS. 1 and 2, one switch being employed to reverse the input to one phase of the succeeding transformer and the other switches being employed to bypass a particular transformer or connect the transformers in tandem, the resultant transformer speed being the algebraic sum of the speeds of the individual transformers.

Figure 4:
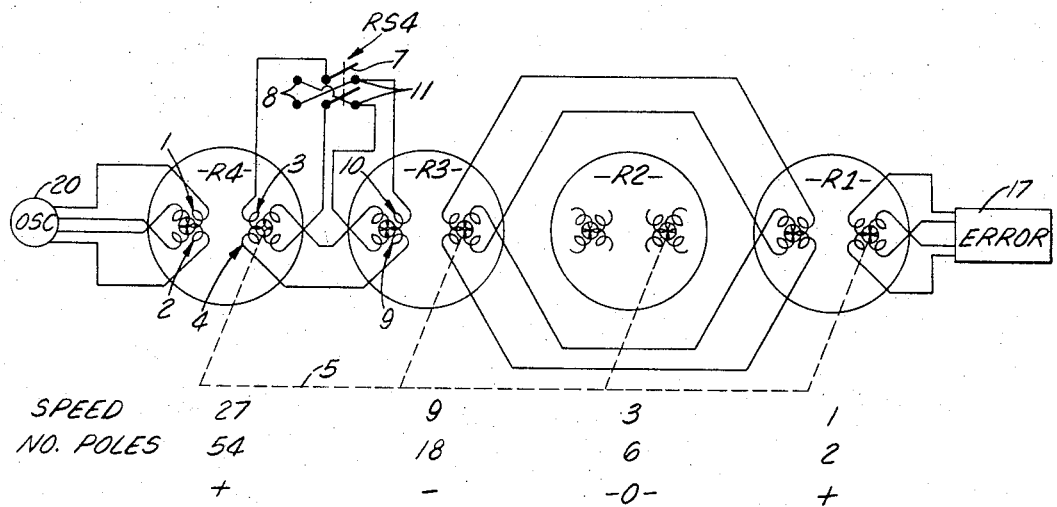

FIG. 4 is a schematic showing of the transformers associated with one shaft as in FIGS. 1 and 2, illustrating a typical connection of the transformers to obtain another particular value of a large number of possible transformer speeds.

Referring in detail to the drawings, the items R1 to R4 represent position measuring transformers in the form of resolvers. Each position measuring transformer R1 to R4 has a polyphase input winding, two windings 1, 2 being indicated in FIG. 3, with polyphase output windings 3, 4. Oscillator 20 in FIGS. 1, 2 and 4 supplies a polyphase input, as is well known.

As shown in FIGS. 1, 2 and 4, the transformers R1 to R4 have rotors mounted on one shaft 5. The transformers R1 to R4 associated with shaft 5 may be referred to as a group or series 15, switching means S1 to S8 being provided for connecting any one or more of the transformers in group 15 in tandem with each other, or for bypassing the output to a line like 12, 13, see FIG. 3, and switching means RS1 to RS4 being provided for reversing one phase of the polyphase input. A typical detail of these switches is shown in FIG. 3 between transformers R3 and R4. When the blades 7 of switch RS4 connect with contacts 8, the output winding 4 of R4 is connected in one sense to one phase 9 of the input winding of R3 and when blades 7 in the alternate position are connected to contacts 11, the input from winding 4 is connected in the reverse sense to winding 9. Switches S6 and S7 in the position shown in FIG. 3 connect R4 in tandem with R3, the polyphase windings 3, 4 of R4 being connected to supply an input to the polyphase windings 10, 9 respectively, of R3. R3 is bypassed when S6, S7 are in the alternate position, the output of R4 being connected to lines 12, 13.

As shown in FIGS. 2 and 4, the speed of transformers R1 to R4 increases from right to left in accordance with powers of three, R1 having a speed of 1, R2 having a speed of 3, R3 having a speed of 9 and R4 having a speed of 27. In this case, the number of poles of R1 to R4 would be respectively 2, 6, 18, 54.

Referring to FIG. 2, in the group 15, R4 is connected in tandem with R2, whereas R3 and R1 are bypassed, whereby the resultant speed is 27+3 or 30.

The following table shows that transformers R1 to R4 with these speed values make it possible to obtain a sequence of resultant speeds from 1 to 40. This table also shows a speed value 81 for a fifth transformer, not shown, indicating only the additional resultant speed 41, whereas it is obvious that the transformer of speed 81 may be combined with the other four transformers to provide a total of 1+3+9+27+81 equals 121 resultant speeds.

TABLE

| Number of Poles | 2 | 6 | 18 | 54 | 162 |
|---|---|---|---|---|---|
| Speed of Individual Resolvers | 1 | 3 | 9 | 27 | 81 |
| Resultant Speed: | | | | | |
| 1 | + | | | | |
| 2 | − | + | | | |
| 3 | | + | | | |
| 4 | + | + | | | |
| 5 | − | − | + | | |
| 6 | | − | + | | |
| 7 | + | − | + | | |
| 8 | − | | + | | |
| 9 | | | + | | |
| 10 | + | | + | | |
| 11 | − | + | + | | |
| 12 | | + | + | | |
| 13 | + | + | + | | |
| 14 | − | − | − | + | |
| 15 | | − | − | + | |
| 16 | + | − | − | + | |
| 17 | − | | − | + | |
| 18 | | | − | + | |
| 19 | + | | − | + | |
| 20 | − | + | − | + | |
| 21 | | + | − | + | |
| 22 | + | + | − | + | |
| 23 | − | − | | + | |
| 24 | | − | | + | |
| 25 | + | − | | + | |
| 26 | − | | | + | |
| 27 | | | | + | |
| 28 | + | | | + | |
| 29 | − | + | | + | |
| 30 | | + | | + | |
| 31 | + | + | | + | |
| 32 | − | − | + | + | |
| 33 | | − | + | + | |
| 34 | + | − | + | + | |
| 35 | − | | + | + | |
| 36 | | | + | + | |
| 37 | + | | + | + | |
| 38 | − | + | + | + | |
| 39 | | + | + | + | |
| 40 | + | + | + | + | |
| 41 | − | − | − | − | + |

The number of transformers in group 15 may be varied from a minimum of 1 to a maximum of any desired number. The speed ratio of the transformers in a group may vary progressively in accordance with some system other than the tertiary system illustrated in the drawings and table, but this tertiary system is preferred as it is possible to obtain 40 different transformer speeds with the use of only four transformers.

FIG. 4 is a typical example of the various switches operated so as to obtain a resultant speed of 19 from the transformers R1 to R4. The table shows that 19 is 1+27−9, 3 being 0.

This is carried out in FIG. 4 wherein R4 supplies an input to R3, reversing switch RS4 reversing the input to winding 10 of one phase of R3 which supplies its output to the input of R1, bypassing R2. The speed and number of poles of R1 to R4 is indicated below each transformer in FIG. 4.

Various modifications may be made in the invention without departing from the spirit of the following claims. For example, the oscillator 20 may supply a particular value of the current for each phase representative of a corresponding angular position of shaft 5, the error current from error amplifier EA16 in FIGS. 1 and 2 or as indicated at 17 in FIG. 4 representing the departure, if any, of shaft 5 from the angular position designated by the input 20. Also, another series of transformers may be associated with another shaft and the two series connected in tandem to provide an error current representative of the speed ratio of the shafts as pointed out above. Also, the speed of the transformers may vary progressively according to some system other than the tertiary system.

I claim:
1. A position measuring transformer system comprising a plurality of position measuring transformers of unequal speeds, speed being equal to one-half the number of poles, each transformer having relatively movable members, each of said members having a winding having a plurality of poles, a common drive for said movable members, input and output windings cooperating with said members respectively, one of said windings of each transformer being a polyphase winding, the windings of at least two of said transformers being connected in tandem, the speed of said connected transformers being the algebraic sum of the speed of each of said connected transformers.

2. A position measuring transformer system according to claim 1, said transformers having progressively different speeds.

3. A position measuring transformer system according to claim 1, said plurality of transformers having different speeds having values corresponding to $3^0$, $3^1$, ... $3^n$, where "$n$" is an integer.

4. A position measuring transformer system comprising a plurality of position measuring transformers of unequal speeds, speed being equal to one-half the number of poles, each transformer having relatively movable members, each of said members having a winding having a plurality of poles, a common drive for said movable members, input and output windings cooperating with said members respectively, one of said windings of each transformer being a polyphase winding, the windings of at least two of said transformers being connected in tandem, the speed of said connected transformers being the algebraic sum of the speed of each of said connected transformers, and switching means for selectively connecting a desired number of said transformers in tandem and for bypassing the remainder, and other switching means for reversing the terminals of certain of said connected transformers and switching means for selectively connecting a desired number of said transformers in tandem and for bypassing the remainder, and other switching means for reversing the terminals of certain of said connected transformers.

5. A variable speed position measuring transformer system, transformer speed being the number of cycles of coupling wave per revolution of a transformer rotor, said transformer system comprising a series of rotary position measuring transformers each having a stator and rotor, a shaft on which said rotors are mounted, each transmore having an input winding and an output winding, one of said windings being a polyphase winding, an input circuit having a source of oscillations, an output circuit, a first switching means for connecting the input winding of any one of these series to said input circuit and the output winding thereof to said output circuit, other switching means for connecting any two or more of said series in tandem between said input circuit and said output circuit, and further switching means for reversing one phase of the polyphase winding of each transformer of the series with respect to its other winding.

6. A rotary variable speed position measuring transformer system according to claim 5, said first switching means comprising means for varying the resultant speed of said series of transformers in uniform steps in a number larger than the number of the position measuring transformer in said series.

References Cited

UNITED STATES PATENTS 2,598,250   5/1952   Gehman _____ 318—20.735
2,750,545   6/1956   Davis _____ 318—20.735
2,881,419   4/1959   Rothbart _____ 340—198

JOHN F. COUCH, *Primary Examiner.*

A. D. PELLINEN, *Assistant Examiner.*